May 22, 1923.

W. AAB

BORING BAR TOOL

Filed Nov. 11, 1920

Inventor
William Aab
By his Attorney
Harry D. Kilgore

May 22, 1923.
W. AAB
BORING BAR TOOL
Filed Nov. 11, 1920   2 Sheets-Sheet 2
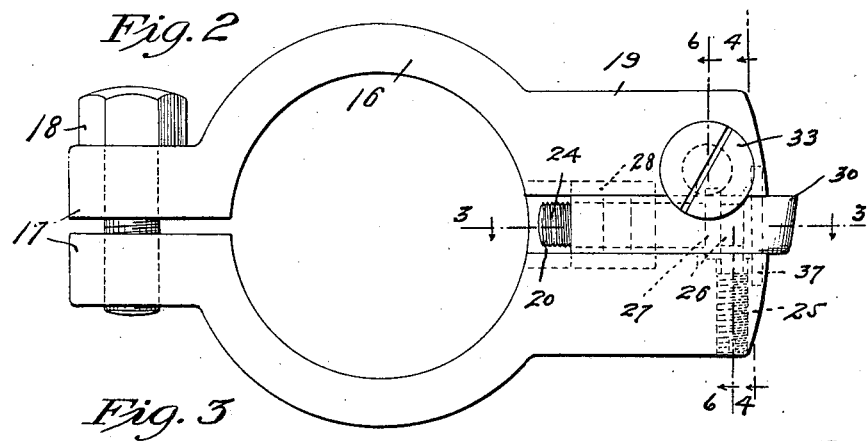
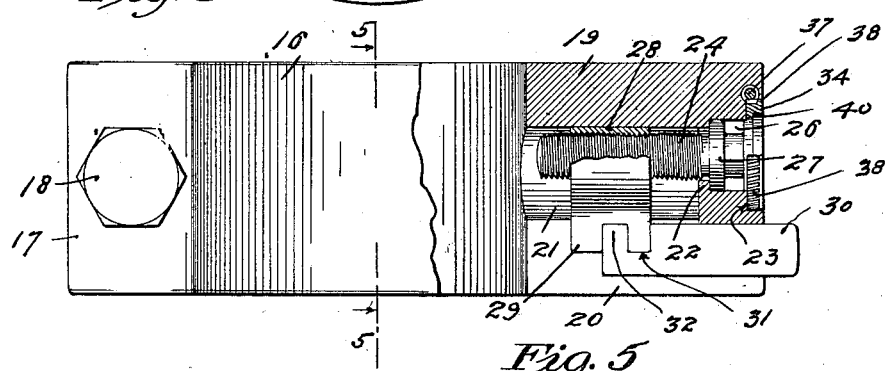
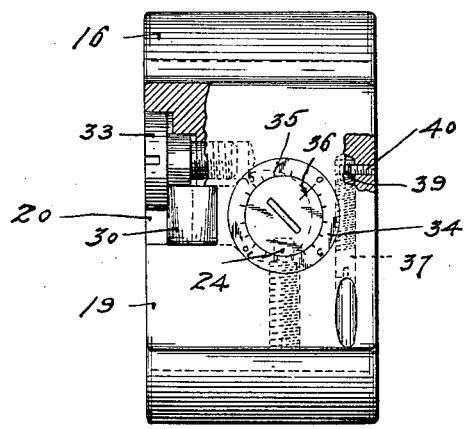
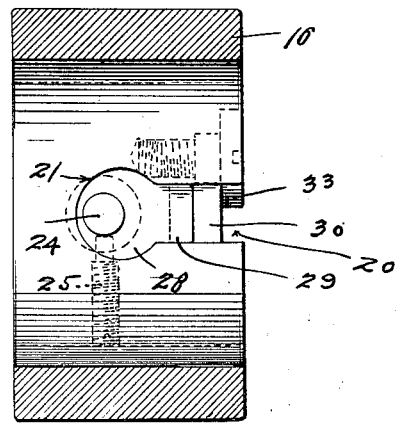
Inventor
William Aab
By his Attorney
Harry D. Kilgore Patented May 22, 1923.

1,456,351

UNITED STATES PATENT OFFICE.

WILLIAM AAB, OF NEW ULM, MINNESOTA, ASSIGNOR OF ONE-HALF TO FERDINAND CRONE, OF NEW ULM, MINNESOTA.

BORING-BAR TOOL.

Application filed November 11, 1920. Serial No. 423,472.

*To all whom it may concern:*

Be it known that I, WILLIAM AAB, am a citizen of the United States, residing at New Ulm, in the county of Brown and State of Minnesota, have invented certain new and useful Improvements in Boring-Bar Tools; and I do hereby declare the following to be a full, clear, and exact description of the invention, such as will enable others skilled in the art to which it appertains to make and use the same.

My present invention has for its object to provide an extremely simple and highly efficient universal boring bar tool, especially adapted for use in boring engine cylinders.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 2 is an enlarged front elevation of the invention removed from the boring bar;

Fig. 3 is a view partly in plan and partly in section, taken on the line 3—3 of Fig. 2;

Fig. 4 is an end elevation of the boring head, with some parts sectioned in the vicinity of the line 4—4 of Fig. 2;

Fig. 5 is a view in section taken on the line 5—5 of Fig. 3;

Figure 1:
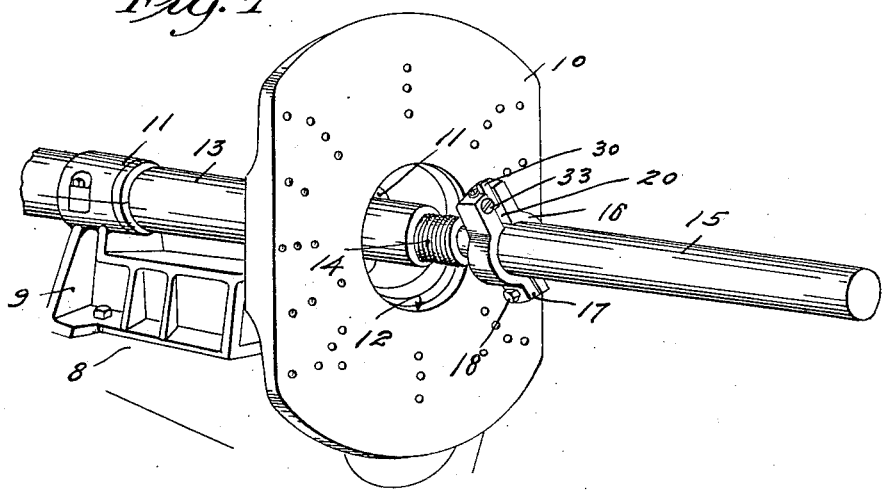
Fig. 1 is a fragmentary perspective view of a boring bar having the invention applied thereto, said boring bar being mounted in a bearing bracket on a lathe frame for compound axial and rotary movements and working through a face plate on said lathe frame.

The numeral 8 indicates the frame of the lathe on which is mounted a bracket 9 and a face plate 10. The bracket 9 is provided with a pair of axially spaced bearings 11 and the face plate 10 is provided with a central opening 12 axially aligned with said bearing. Mounted in the bearings 11, for compound axial and rotary movements, is a boring bar 13, said movements of the boring bar being imparted thereto from movable parts of the lathe, not shown. The outer end of the boring bar 13 is provided with an externally and internally screw-threaded reduced end 14. A spindle 15 is detachably secured to the boring bar 13 by screwing one of its ends into the internal screw threads of the ends 14. The external screw threads, on the end 14, are provided to receive and hold, on the boring bar 13, a centering tool, not shown.

The numeral 16 indicates a transversely divided collar having at its ends outturned lugs 17, through one of which loosely extends a screw 18 having screw-threaded engagement with the other of said lugs. The collar 16 snugly fits on the spindle 15 with freedom for circumferential and axial adjustments thereon and is frictionally clamped thereto by the screw 18.

Formed with the collar 16, diametrically opposite the lugs 17, is a boring head 19 having in its front face a channel 20, which extends radially in respect to the axis of the boring bar 13. A relatively large bore 21 extends through the boring head 19, between the channel 20 and back of said head and parallel to said channel. The outer portion of the bore 21 is expanded to afford an annular shoulder 22, and outward of this shoulder, it is further expanded to afford an open seat 23. The bottom of the channel 20, inward of the shoulder 22, opens directly into the bore 21 for a purpose that will presently appear.

Figure 6:
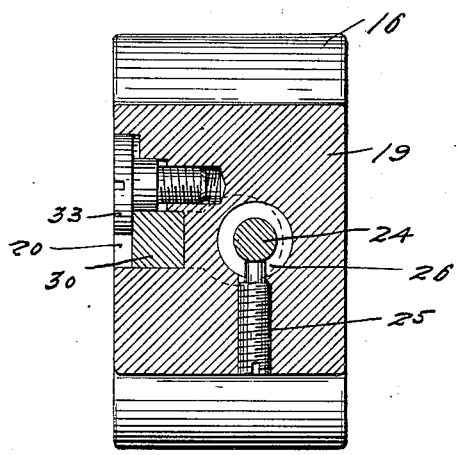
Fig. 6 is a view principally in section taken on the irregular line 6—6 of Fig. 2.
Figure 7:
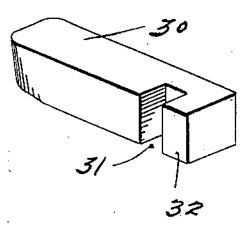
Fig. 7 is a perspective view of the cutting tool removed from the boring head.

A micrometer screw 24 extends axially into the bore 21, with its head mounted in the seat 23 and flush with the end of the boring head 19. To hold this screw 24 against axial movement, there is screwed into the boring head 19, from the under side thereof, a screw 25 having a reduced inner end which extends into an annular channel 26 formed between the head of the screw 24 and a collar 27 formed with said screw, as best shown in Fig. 6. The inner face of the collar 27 seats against the shoulder 22.

Mounted on the screw 24 is an annular nut block 28, which closely fits within the bore 21 for axial movement under the action of the screw 28. This nut block 28 is provided with a radially projecting bifurcated extension or lug 29, which projects into the channel 20 and one of its functions is to hold said nut block against rotation.

A cutting tool 30 is mounted in the channel 20 for endwise sliding movement. The cutting end of this tool 30 projects from the channel 20 through the outer end of the boring head 19 and is adjusted toward and from the axis of the boring bar 13, under the action of the screw 24, by connecting the same to the nut block 28. To detachably connect the cutting tool 30 to the nut block 28, the same is provided near its inner end with a transverse slot 31 to receive one of the prongs of the lug 29 and to afford thereon a lug 32, which extends between the prongs of the lug 29. The cutting tool 30 is held on the bottom of the channel 20 and interlocked with the lug 29 of the nut block 28, which supports the inner end of said cutting tool, by the head of a screw 33, which is screwed into the boring head 19, as best shown in Fig. 6.

Mounted in the seat 23, concentric with the head of the screw 24, for rotation thereon, is an annular scale 34, which, as shown, is graduated in twentieths, for co-operation with an indicator 35 on the head of said screw. It may be here stated that the screw 24 has twenty-five threads to the inch, and a step of movement of said screw, equal to one of the graduations on the scale 34 or one twentieth of the circumference of the scale, will impart a movement to the cutting tool 30 equal to two-thousandths of an inch.

To rotate the scale 34 in respect to the screw 24 and lock said scale in different adjustment, there is mounted in the boring head 19 a worm 37, which meshes with a worm gear 38 formed on the periphery of the head of the screw 24. The outer end of the worm 37 is provided with a slot for the application of a screw-driver by which said worm may be turned. To hold the worm 37 against axial movement, an annular channel 39 is formed in and near the inner end thereof, into which projects the inner end of a screw 40, which is screwed into the boring head 19 from the back thereof. The scale 34 is held in the seat 23 by engaging annular shoulders 41 on said scale and the head of the screw 24.

To use the invention in boring an engine cylinder, said cylinder is first bolted to the face plate 10 after being centered, in respect to the axis of the boring bar 19, by a centering device applied to the exterior threads of the end 14. After the cylinder is centered, this centering device is removed from the end 14 and the invention applied to the spindle 15, or, in some instances, it may be applied direct to the boring bar 13. Before the boring head 19 is moved into the cylinder, the cutting tool 30 is retracted by operating the screw 24. The boring bar 13 is then projected axially to carry the boring head 19 into the cylinder and the screw 24 turned to project the cutting tool 30, so that its outer or cutting end touches the internal wall of the cylinder. The boring bar 13 is then retracted to carry the boring head 19 out of the cylinder.

The scale 34 is then rotated by means of the worm 37 to bring its zero point into registration with the indicator 36 on the head of the screw 24. If a two-thousandth-of-an-inch cut is to be made in the cylinder the screw 24 is turned to move its indicator 36 into registration with the first mark on the scale 34 to the right of the zero point on the scale. The rotating boring head 19 is then fed into the cylinder and the cut made in the customary manner. Further cuts, of course, may be made in the cylinder by adjusting the screw 24 as previously described. After the boring of the cylinder is complete, the operator can tell the exact depth of the cut made in the cylinder by noting the distance the indicator 36 has been turned from the zero point on the scale 34.

The worm 37 will securely hold the scale 34 so that it can move during the cutting action of the tool and if desired, said screw action of the tool may be further held by turning the screw 40 against the same. The screw 24 may be positively held so that it will not move during the cutting action of the tool by turning the screw 25 thereagainst.

The connections between the tool 30 and the screw 24 positively holds the tool, wherever set, against either projecting or retracting movements. Metal chips, dirt or other objects cannot interfere, in any way, with the adjustment of the cutting tool 30. The collar 16 permits the cutting tool 30 to be adjusted to any point on the spindle 15.

What I claim is:

1. The combination with a holder, of a micrometer screw mounted in the holder against axial movement and having on its head an indicator, an annular scale circumferentially adjustable around the head of said screw for co-operation with its indicator, means for positively turning said scale and locking the same in different adjustments, a non-rotary traveling nut block on said screw, and a cutting tool mounted in the holder and connected to said block.

2. The combination with a holder, of a micrometer screw mounted in the holder against axial movement and having on its head an indicator, an annular scale circumferentially adjustable around the head of said screw for co-operation with its indicator, said scale having a worm gear, a worm meshing with the worm gear and held in the holder against axial movement, a non-rotary traveling nut block on said screw, and a cutting tool mounted in the holder and connected to said block.

3. The combination with a holder, of a micrometer screw mounted in the holder against axial movement and having on its head an indicator, an annular scale circumferentially adjustable on the holder around the head of said screw for co-operation with its indicator, said scale being held on the holder by the head of the screw, means for positively turning the scale and locking the same in different adjustments, a non-rotary traveling nut block on said screw, and a cutting tool mounted in the holder and connected to said block.

In testimony whereof I affix my signature.

WILLIAM AAB.